(12) United States Patent
Conboy (10) Patent No.: US 7,223,311 B2
(45) Date of Patent: May 29, 2007

(54) METHOD AND APPARATUS FOR FABRICATING GYPSUM BOARD

(76) Inventor: John S. Conboy, 2235 Devonsbrook Dr., Chesterfield, MO (US) 63005

( * ) Notice: Subject to any disclaimer, the term of this patent is extended or adjusted under 35 U.S.C. 154(b) by 220 days.

(21) Appl. No.: 10/263,040

(22) Filed: Oct. 2, 2002

(65) Prior Publication Data
US 2004/0065399 A1 Apr. 8, 2004

(51) Int. Cl.
*B29C 59/04* (2006.01)
*B32B 37/15* (2006.01)

(52) U.S. Cl. .................. 156/45; 156/347; 156/348; 264/296; 425/335; 425/385

(58) Field of Classification Search .................. 156/44, 156/45, 347, 348, 39; 264/296; 425/335, 425/343, 385
See application file for complete search history.

(56) References Cited

U.S. PATENT DOCUMENTS

| | | | | |
|---|---|---|---|---|
| 1,676,318 A | * | 7/1928 | Birdsey ....................... | 156/348 |
| 1,871,563 A | * | 8/1932 | Ericson ....................... | 156/347 |
| 2,180,570 A | * | 11/1939 | Walper ........................ | 451/190 |
| 2,246,987 A | * | 6/1941 | Roos .......................... | 156/347 |
| 2,991,824 A | * | 7/1961 | Loechl ........................ | 156/347 |
| 3,233,301 A | * | 2/1966 | Tillisch et al. ............. | 425/385 |
| 4,734,163 A | * | 3/1988 | Eberhardt et al. ........ | 162/181.3 |
| 5,198,052 A | * | 3/1993 | Ali ............................... | 156/45 |
| 2001/0044016 A1 | * | 11/2001 | Watras ........................ | 156/45 |

FOREIGN PATENT DOCUMENTS

JP 58-41776 * 3/1983

OTHER PUBLICATIONS

Abstracts for WO 2004/007162.*

* cited by examiner

*Primary Examiner*—Steven D. Maki
(74) *Attorney, Agent, or Firm*—Polster, Lieder, Woodruff & Lucchesi L.C.

(57) ABSTRACT

A method enables gypsum/fiber board to be manufactured such that recessed areas are formed on the same face of the cut wallboard on all four edges without interrupting the production line. The system accommodates different lengths of cut wallboard as the lateral cut edge recess forming apparatus is adjustable in width to accommodate different lengths of cut wallboard.

4 Claims, 7 Drawing Sheets

METHOD AND APPARATUS FOR FABRICATING GYPSUM BOARD

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates generally to gypsum board, and more specifically to a method and apparatus for fabricating gypsum board.

Conventional gypsum wallboard or drywall is typically manufactured from a gypsum plaster slurry which is put between two layers of paper. More specifically, in the conventional method, a wet slurry of gypsum is poured on a conveyor between two layers of paper, and the slurry is allowed a certain amount of time to set. In gypsum wallboard, the two layers of paper contain the slurry and provide the tensile strength required in installation and use.

In at least some known fabrication methods, the conveyor is a closed loop conveyor that can travel at speeds of four hundred feet per minute or faster. The conveyor enables the wallboard to be fabricated using rolls of paper and accordingly, includes at least a longitudinal edge forming system, a cutting system, and a drying system. The edge forming system uses wedge shaped raised edges along the conveyor that create recessed areas along the longitudinal edges in the face of the wallboard prior to the wallboard being fully cured. When the wallboard is later cut to size and installed, the recesses are filled with drywall compound, taped over, and finished to produce a smooth joint.

The cutting system enables the wallboard to be cut into predetermined discrete lengths such that substantially rectangular wallboard members are formed. The cutting system is adjustable to allow different lengths of wallboard to be cut without substantial interruption of the manufacturing operation.

After being cut, the wallboard members are moved away from the cutting station to a loading area where they are loaded into a drying system to dry the cut wallboard members.

Known wallboard includes recessed areas that extend along both of the opposed longitudinal edges of the wallboard. The recessed areas are formed by the raised edges on the conveyor. The recessed areas are in the shape of inclined planes that taper from the face of the wallboard to the longitudinal edges and have a maximum depth at the side edges of about 0.05" below the face of the wallboard.

When the wallboard is cut by the cutting system, panels of conventional wallboard are formed which are bordered by the opposed recessed longitudinal edges and by a pair of lateral non-recessed edges that connect the longitudinal edges. More specifically, the wallboard is typically cut such that the panels are fabricated with a longitudinal length that is commonly eight feet, ten feet, twelve feet, fourteen feet, or sixteen feet. For maximum efficiency and conservation of plant space, the same line must have the capability of fabricating all of the different lengths of wallboard without a major shutdown of the line.

During installation, depending on the length of the wall being formed by the wallboard, wallboard panels are typically positioned for installation such that the longitudinal edges are parallel to the floor, an installation known as a "horizontal orientation". In this installation, a longitudinal recess of a first panel is adjacent to a longitudinal recess of the adjacent panel. This forms a longitudinal recessed joint. A drywall compound fill material and tape are then used to seal the recessed joint formed by the recessed longitudinal edges of the panels. Specifically, the recessed areas of the joints are filled with the drywall compound, taped and smoothed across the joint, such that the joint is covered without the compound creating an unsightly bulge extending outwardly between the panels. Installing the wallboard panels such that the longitudinal length extends horizontally along a wall parallel to the floor, rather than vertically and substantially perpendicularly to the floor, facilitates faster installation time of the wallboard panels, and faster finishing time of the installed wallboard panels. In addition, when wallboards are installed in a vertical orientation, installation and labor costs may be increased as the installers and tapers must use ladders for installation and finishing.

When wallboard panels are installed on longer walls and ceilings, because the recessed areas only extend along two longitudinal edges of each panel, a butt joint may be formed between the lateral edges of two adjacent panels. Such joints must still be covered with tape and compound, but because the lateral edges do not include a recessed area, the joint compound must be spread over a wider area than those of the longitudinal joints to facilitate blending the butt joints into the wall surface without creating unsightly bulges.

BRIEF SUMMARY OF THE INVENTION

Principal aspects of the invention are a method and a system for forming recessed areas along one or both of the lateral cut edges of wallboard panels on the same face of the wallboard as the longitudinal recesses. A lateral edge forming system is used to form lateral recessed areas along the cut lateral edges of the wallboard panels such that each lateral recessed area is on the same face of the wallboard as the longitudinal recesses.

The recesses in the lateral cut edges of the wallboard panels may be formed both in-line and off-line of the main wallboard fabrication process.

In one aspect of the invention, a method for manufacturing gypsum/fiber board using a forming system is provided. The forming system includes a least one closed loop conveyor. The method comprises forming a continuous wallboard slab on the conveyor. The wallboard slab includes an outer paper surface and an opposite inner paper surface with a plaster slurry between the two layers of paper. The conveyor has raised wedge-shaped edges for forming the recessed areas along each longitudinal side edge of the wallboard slab. The method also comprises cutting the wallboard to a first desired cut length such that the longitudinal side edges are connected by first and second lateral cut side edges, forming lateral recessed areas along the first and second lateral cut edges on the same side of the cut wallboard as the longitudinal recesses, and drying the cut wallboard.

In another aspect of the invention, a system for manufacturing gypsum/fiber board is provided. The system includes a forming system, a cutting system and a lateral edge forming system. The forming system includes at least one closed loop conveyor and longitudinal edge formers. The forming system is used to fabricate, from paper facings and slurry sandwiched therebetween, a wallboard slab on the conveyor that includes an outer surface and an opposite inner surface that are bordered by a pair of longitudinal side edges. The conveyor edges are raised to form longitudinal recessed areas along the wallboard side edges. The cutting system is for cutting the wallboard to a first desired cut length such that the longitudinal edges of the cut wallboard are connected by first and second lateral cut edges. The lateral edge former is used for forming lateral recessed areas along the wallboard first and second lateral cut edges such that each lateral recessed area is on the same side of the wallboard as the longitudinal recesses. The manufacturing system also includes a drying system for the cut and recessed wallboard.

In both of the aforesaid method and system, the cutting and lateral edge forming steps are coordinated whereby wallboard panels of different lengths and having recessed areas along all four edges can be fabricated on the same line and apparatus without a major shutdown of the line or stopping production.

BRIEF DESCRIPTION OF THE SEVERAL VIEWS OF THE DRAWINGS

In the drawings, where like numerals and letters refer to the parts wherever they occur.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
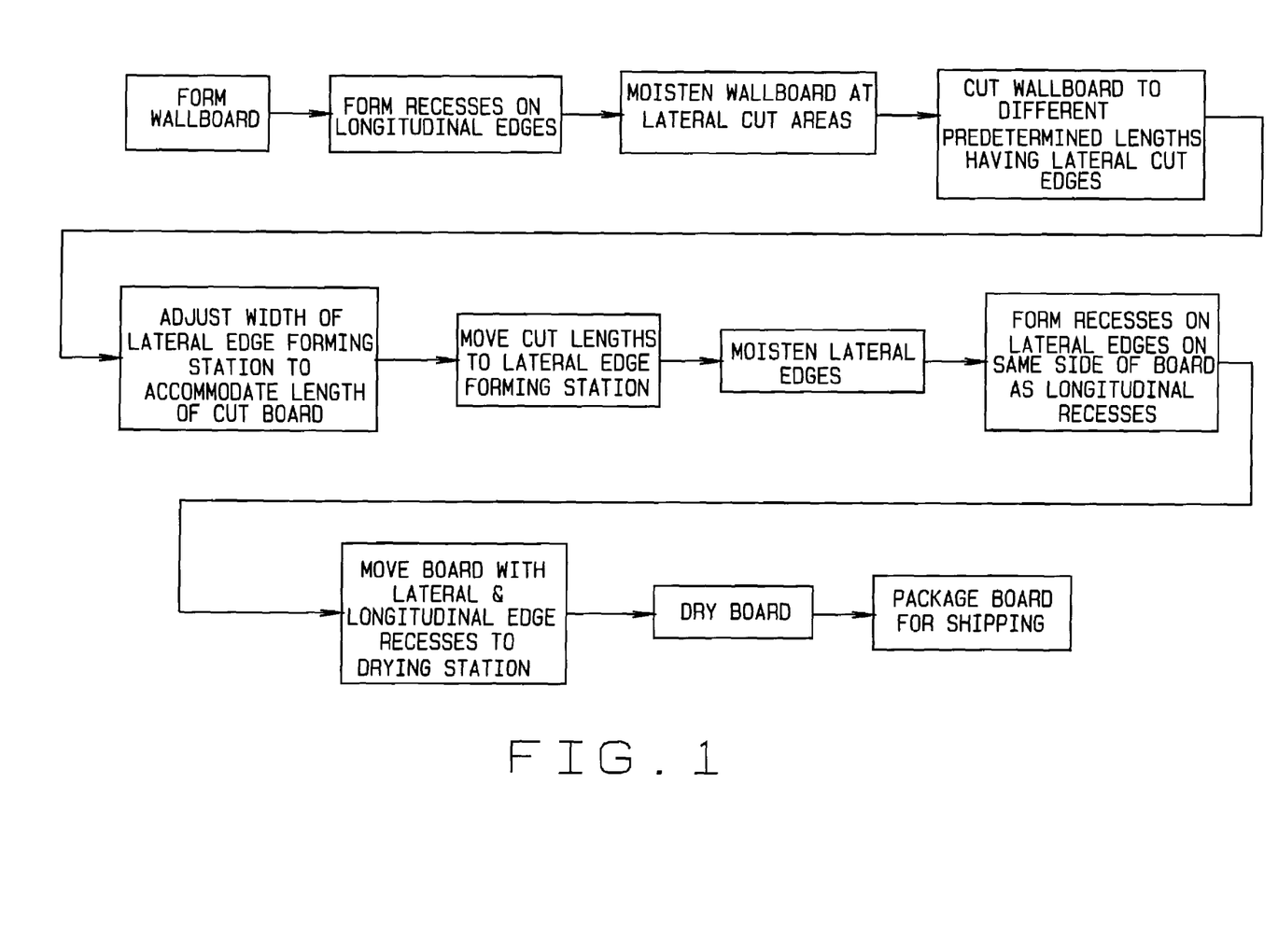
FIG. 1 is diagrammatic block diagram of the flow process of this invention.

FIG. 1 shows a block diagram of a process for making wallboard using the present invention.

Figure 2:
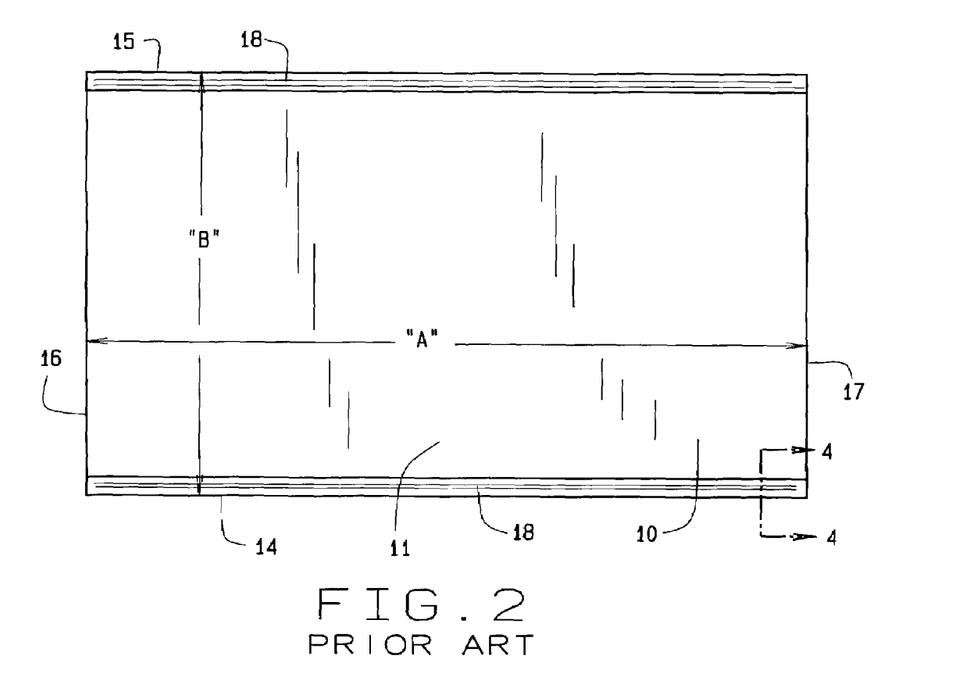
FIGS. 2–4 are prior art wallboard.
Figure 3:
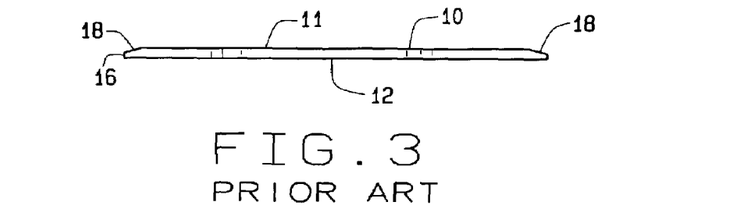
Figure 4:
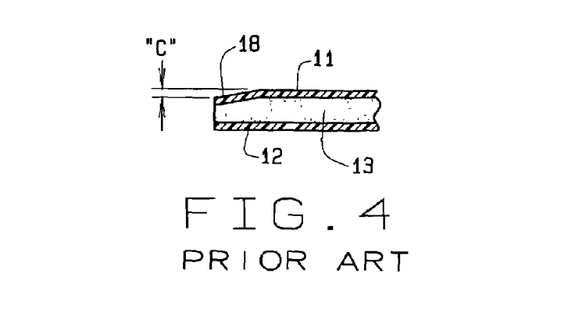

FIGS. 2–4 show known wallboard panels which are conventional in the art.

FIG. 2 is a plan view of a conventional wallboard panel 10. FIG. 3 is a side view of the wallboard panel 10, and FIG. 4 is a sectional view of a longitudinal edge of the panel 10. The wallboard panel 10 is fabricated using known fabrication methods and includes an outer or face surface 11 and an opposite inner surface 12. Outer and inner surfaces 11 and 12, respectively, are paper and a gypsum plaster center 13 is sandwiched between the paper surfaces 11, 12. The board 10 has spaced longitudinal side edges 14 and 15 and a pair of spaced lateral side edges 16 and 17. More specifically, the lateral edges 16 and 17 connect the longitudinal edges 14 and 15, such that the panel 10 is substantially rectangular in shape.

A length "A" of the panel 10 is measured between the lateral edges 16 and 17, and a width "B" of the panel 10 is measured between the longitudinal edges 14 and 15. A conventional panel 10 is fabricated such that the width B is approximately four feet, and the length A is approximately one of eight feet, ten feet, twelve feet, fourteen feet, or sixteen feet.

The panel outer and inner surfaces 11 and 12, respectively, are substantially planar. However, the panel outer surface 11, as is well known, also includes a pair of longitudinal recessed areas 18 that extend the panel length "A" adjacent to the longitudinal side edges 14 and 15. Each recessed area 18 extends from the outer surface 11 toward the longitudinal edges 14,15 such that the depth "C" of the recesses 18 at the longitudinal edges 14,15 is approximately 0.050 inches.

Figure 5:
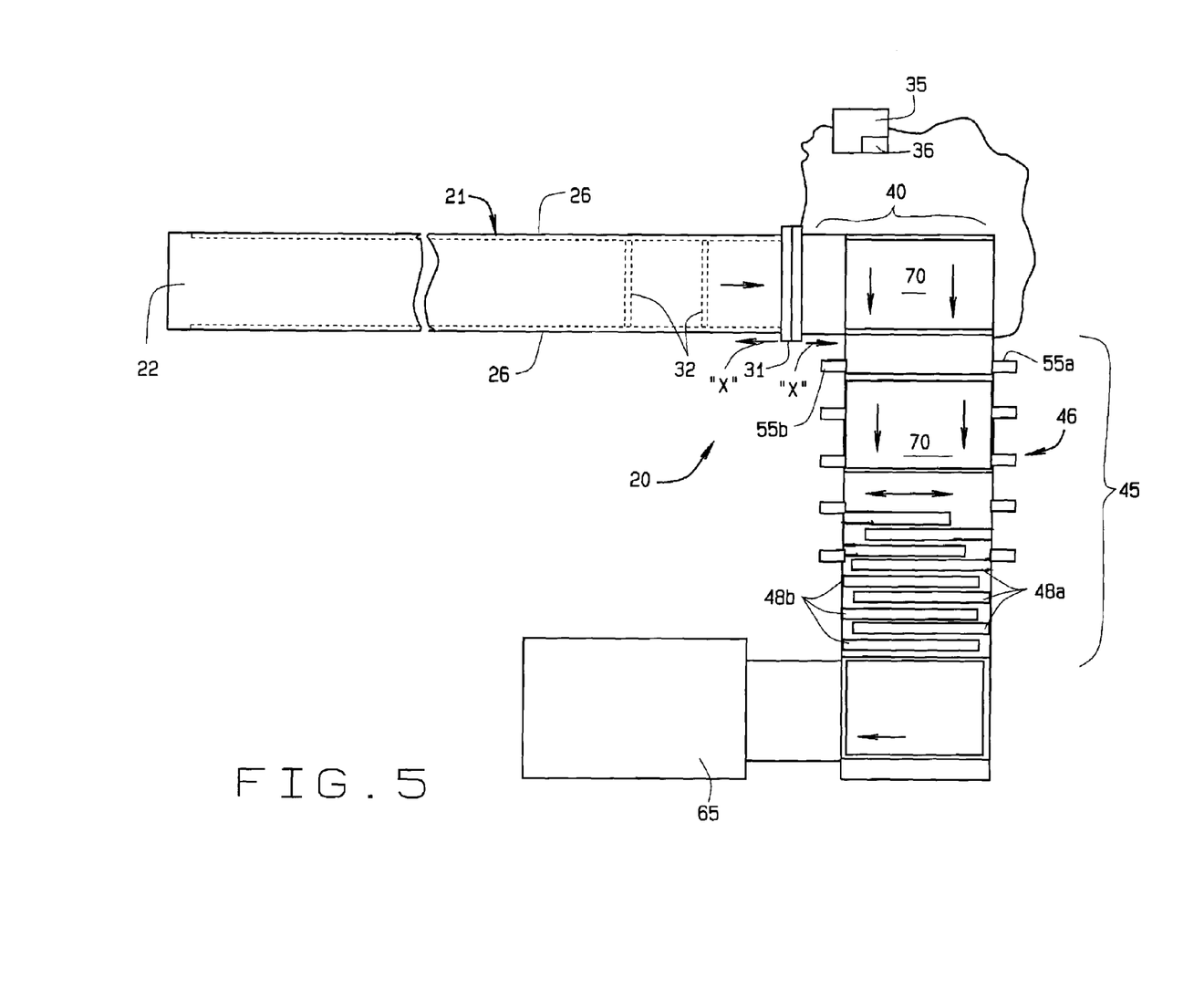
FIG. 5 is a schematic plan view of this invention.
Figure 6:
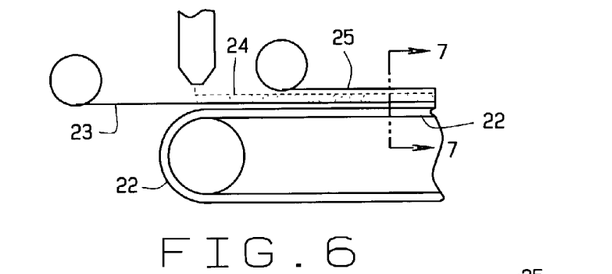
FIG. 6 is an elevational view of the initial portion of the wallboard slab forming process.
Figure 7:
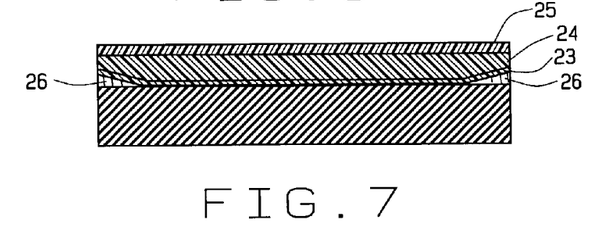
FIG. 7 is a sectional view taken along line 7—7 of FIG. 6.

FIGS. 5–7 are schematic views of a preferred wallboard panel manufacturing system 20 of this invention. The manufacturing system 20 includes a wallboard slab forming system 21 that is based on a closed loop main conveyor belt 22. The conveyor belt 22 travels at speeds of approximately four hundred feet per minute or faster. The forming system 21 is known in the art for fabricating fiber gypsum boards from a variety of different fibers. More specifically, depending upon a desired composite form of wallboard panel to be fabricated, the forming system applies a face layer of paper 23 to the conveyor belt 22, followed by predetermined amounts of pre-moistened gypsum 24 and desired additives. The gypsum 24 is covered by a backing layer of paper 25. This is shown schematically in FIGS. 6 and 7. The composite paper and gypsum forms a matt.

The resultant matt of wetted fibers on the conveyor belt 22 is subject to known degassing systems and compression systems. More specifically, the degassing system facilitates removing gases from the matt prior to the compression system which facilitates compressing the matt to a desired thickness that is substantially uniform across the matt.

After the wallboard is pressed and formed to the desired thickness, the conveyor 22 transports the matt to a cutting station 30. These functions are well known in the art and are not shown in FIG. 5, but are performed on the wallboard slab as it progresses along the conveyor 22.

Along the longitudinal edges of the conveyor belt 22 are wedge shaped elements 26 which form the longitudinal recesses 18 in the wallboard. In the preferred embodiment, the cutting station 30 includes a plurality of water jets 31. Water jets are known in the art and include at least two stationary high pressure water jets, and at least one traversing high pressure water jet. The traversing jet travels in a direction (indicated by the arrows "X" in FIG. 5) parallel to the conveyor belt 22 and cuts the wallboard slab to a desired wallboard panel length, e.g., eight feet, ten feet, etc. The stationary water jets cut and trim the longitudinal edges of each newly formed wallboard panel. The cutting station 30 may include at least one traversing table saw rather than a traversing high pressure water jet. The cutting station may also use a rotating chop cutter to form each wallboard panel. In all instances, the cutting mechanism is adjustable to form wallboard segments of the desired length.

If desired for the purposes of forming recesses on the cut edges, a softening system 32 may be deployed along the conveyor 22 to spray fluid onto the wallboard slab to pre-soften the matt before the operation of the cutting station 30. The spray is water or steam and is applied transversely to the wallboard slab along the cut line immediately prior to the slab being cut.

The cutting station 30 is electrically coupled to an indexing system 35 that is coupled to a programmable logic controller (PLC) 36. Alternatively, a processor is coupled to the cutting station 30. The indexing system 35 signals the cutting station 30 to cut the matt at a desired wallboard length. More specifically, the PLC 36 enables the manufacturing system 20 to fabricate wallboard panels 70 of various desired lengths without stopping operation of the conveyor belt 22. In a preferred embodiment, the indexing system 35 is also coupled to a servo cut-off unit.

In the preferred in-line embodiment, after the wallboard panels 70 are cut to a desired length at the cutting station 30, they are then routed to a transfer assembly 40. The transfer assembly 40 guides the cut wallboard panels 70 in a direction of travel that is substantially perpendicular to their direction of travel on the conveyor belt 22. The transfer assembly 40 moves the cut panels 70 into a lateral edge forming station 45. The panels 70 can be moved by mechanical pushers or by an air mover. The panels 70 also can be turned over before being moved into the lateral edge forming station 45 depending on the orientation of the edge forming apparatus.

Figure 10:
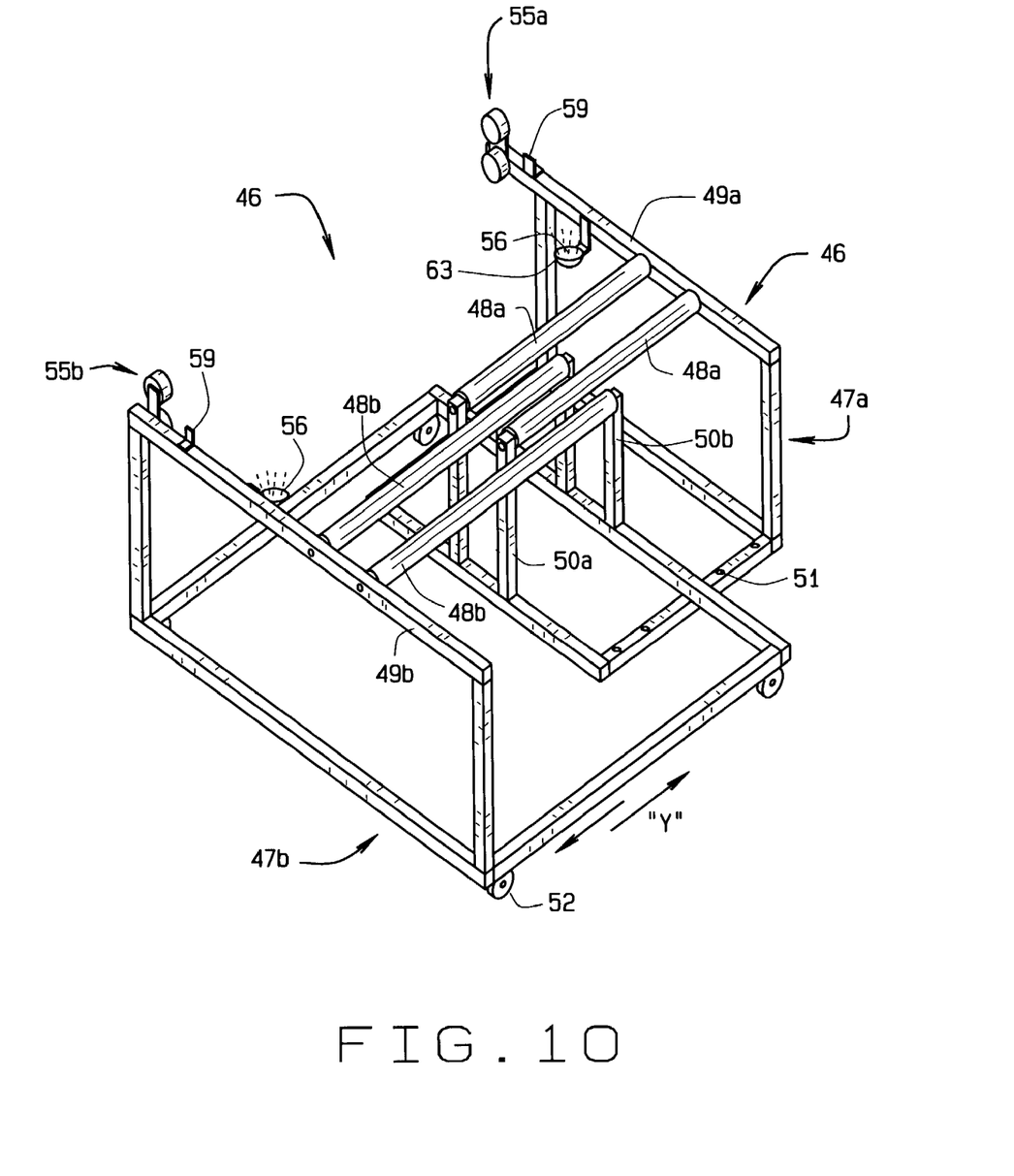
FIG. 10 is a fragmentary perspective view of the lateral edge forming station.

The lateral edge forming station 45 is shown schematically in FIG. 10 and includes a roller conveyor 46 which extends substantially along the full length of the lateral edge forming station 45. The roller conveyor 46 is expandable to accommodate the different lengths of cut wallboard 70. For example, when wallboard lengths of eight feet are being formed at the cutting station 30, the conveyor 46 is set at an eight foot width; when wallboard lengths of twelve feet are being cut at the cutting stations 30, the conveyor 46 is set at twelve foot width, etc. The roller conveyor 46 comprises a frame which has two relatively movable sections 47a and 47b. As shown schematically in FIGS. 5 and 10, the frame section 47a is fixed and the frame section 47b is laterally movable as shown by the arrows "Y". Movement of the frame member 47b allows the width of the conveyor 46 to be adjusted to accommodate different cut wallboard lengths 70.

Mounted on the frame 47a are free wheeling rollers 48a which are rotatably positioned in a longitudinal rail 49a and have an outboard support 50a. The frame 47a is fixed by anchors 51.

Mounted on the frame 47b are freewheeling rollers 48b which are rotatably positioned in a longitudinal rail 49b and have an outboard support 50b. The frame 47b is movable on rollers 52 or along a track to adjust the width of the conveyor 46. The frame 47b is moved by servo motors operatively connected and controlled by the PLC 36. As the width of the conveyor 46 is determined by the length of the cut wallboard 70, movement of the movable frame 47b is synchronized with the movement of the cutting station 30 so that when the cutting station 30 cuts a specific length of wallboard 70, the edge forming station 45 and the conveyor 46 are set to receive that length of wallboard 70.

The lateral edge forming system 45 includes a plurality of pairs of edge rollers 55a and 55b, and a softening system 56. The edge roller pairs 55a are mounted on the longitudinal rail 49a of the fixed frame 47a and the edge roller pairs 55b are mounted on the longitudinal rail 49b of the movable frame 47b. Each respective pair of edges rollers 55a, 55b, is positioned oppositely across the conveyor roller system 46 such that respective pairs 55a, 55b are substantially axially aligned with respect to a cut wallboard panel 70 traversing therebetween. Each pair of edge rollers 55a, 55b includes a progressive edge roller 57 and a planar edge roller 58. The progressive edge rollers 57 are tapered (FIG. 9) or angularly inclined with respect to the inner surface of the wallboard 70 to form recesses in the cut lateral edges of the wallboard 70 on the same side of the wallboard 70 as the recesses formed by the wedge shaped recess forms 26 on the conveyor belt 22. The edge roller pairs 55a,55b are powered to facilitate moving the cut panels 70 through the lateral edge forming station 45 to a drying station 65. The axes of rotation of the rollers 57,58 in such pair 55a,55b are vertically aligned.

The lateral edge forming station 45 includes a plurality of guides 59 positioned between adjacent pairs of rollers to facilitate maintaining alignment of the cut panels 70 within the forming station 45.

The alignment system facilitates maintaining the cut panels 70 in a proper alignment with respect to the lateral edge roller pairs 55a,55b and the conveyer 46. In addition to the guides 59, a vacuum alignment system can be used to facilitate maintaining the panels 70 substantially parallel to the lateral edge rollers 55a,55b as the panels 70 are traversed through the lateral edge forming station 45. An optical control sub-system that uses photo-sensitive sensors to facilitate maintaining an alignment of the panels 70 within the lateral edge forming station 45 also can be used.

Figure 9:
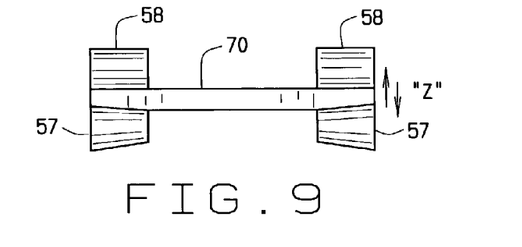
FIG. 9 is an end elevational view of a portion of the lateral edge forming station shown in FIG. 8.

Each respective progressive edge roller 57 is positioned to contact the face surface 11 of each wallboard panel 70 adjacent the wallboard lateral side edges 16 and 17. Each respective planar edge roller 58 is positioned to contact an opposite inner surface 12 of the wallboard panels 70 adjacent the lateral sides edge 16 and 17. The axes of rotation of each roller pair 55a,55b are vertically aligned so the individual rollers 57,58 contact each wallboard panel 70 traversing therethrough approximately simultaneously and at the approximately the same lateral location with respect to each lateral side edges 16,17.

Figure 11:
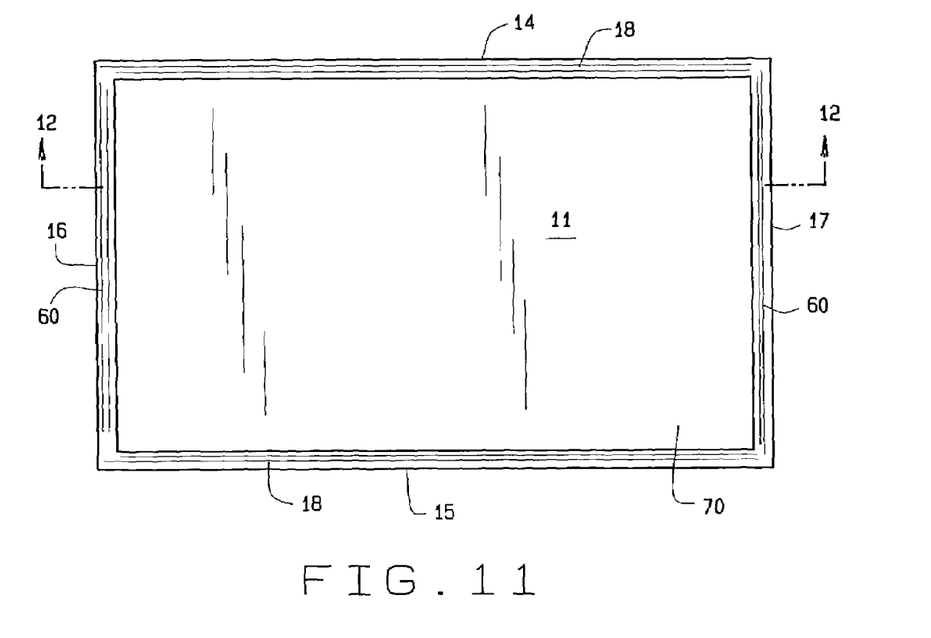
FIG. 11 is a plan view of a completed wallboard section with recesses on longitudinal and lateral edges.
Figure 12:
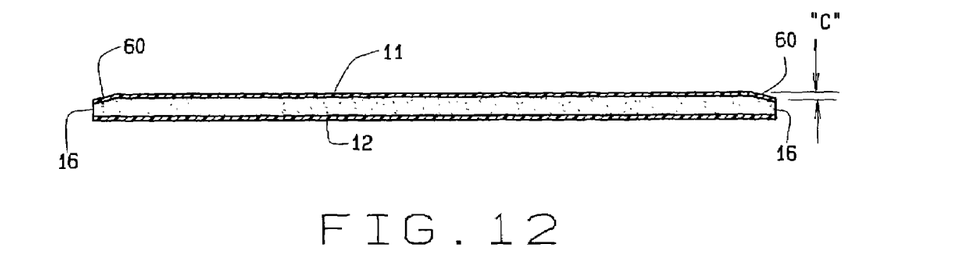
FIG. 12 is an end view of the wallboard section of FIG. 11.

The progressive edge rollers 57 are tapered to form lateral recesses 60 adjacent to the lateral edges 16,17. The lateral recesses 60 are similar to the longitudinal recesses 18. This is shown in FIGS. 11 and 12. Thus, the finished wallboard length 70 has tapered recesses 18,60 on all four edges on the face side 11 of the wallboard 70. The recesses 60 preferably are tapered as shown, but could take other shapes, such as rectangular.

Figure 8:
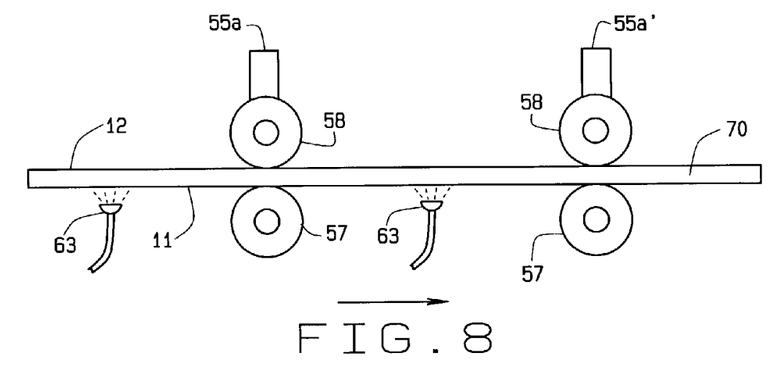
FIG. 8 is a fragmentary schematic view of the lateral edge forming station.

The spacing between the planar roller 58 and the progressive roller 57 in each pair is adjustable and the rollers 57,58 are set so that the spacing decreases incrementally as the board 70 is moved through the lateral edge forming station 45. The planar rollers 58 are fixed and the progressive edge rollers 57 are adjustable toward and away from the planar rollers 58. Referring to FIG. 8, the first roller pair 55a is set to provide a recess 0.01 inches deep, the next roller pair 55a' is set to provide a recess of 0.02 inches deep, and this progression continues until the desired depth of 0.050 inches is obtained. The remaining pairs of edge rollers 55a contact the wallboard panel 70 at a depth of approximately 0.050 inches. The same progression applies to the edge rollers 55b on the opposite side of the wallboard panel 70.

The distance between the planar rollers 58 and the progressive edge rollers 57 (indicated by the arrows "Z" in FIG. 9) also is adjustable depending on the thickness of the wallboard panels being processed. Wallboard generally is formed in ½" to ⅝" thickness. The distance "Z" is automatically adjusted by the indexing system 35 which sences the thickness of the board being processed.

The softening system 56 includes a plurality of injection nozzles 63 which are configured to inject either water or stream towards the wallboard panel inner surface 11 along the lateral edges 16,17. The nozzles 63 are positioned between adjacent progressive edge rollers 57 and are positioned to inject fluids towards the wallboard panel inner surface 11 along each lateral side edge 16,17. Fluid injected from the softening system 63 facilitates the progressive edge rollers 57 forming the lateral recessed areas 60 without inducing cracking into the wallboard panels 70. Furthermore, the softening system 56 facilitates preventing cracking of the partially curved filler and delamination of the paper substrate 23,25 covering the wallboard panels 70.

As the progressive edge rollers 57 contact the wallboard panel inner surface 11, each planar edge roller 58 contacts wallboard panel outer surface 12. More specifically the planar edge rollers 58 facilitate maintaining the wallboard panel outer surface 12 substantially flat while the lateral recess areas 60 are being formed. Accordingly, the wallboard panels 70 that are discharged from the lateral edge roller station 45 include longitudinal recessed areas 18 and lateral recessed areas 60. More specifically, the lateral recessed areas 60 extend along each panel lateral side edge 16,17 between the longitudinal side edges 14,15.

The final step in the processing is drying the cut and formed wallboard pieces 70. The cut and formed wallboard 70 is discharged from the lateral edge roller station 45 to a drying system 65. Production line drying stations are well known in the art.

Figure 13:
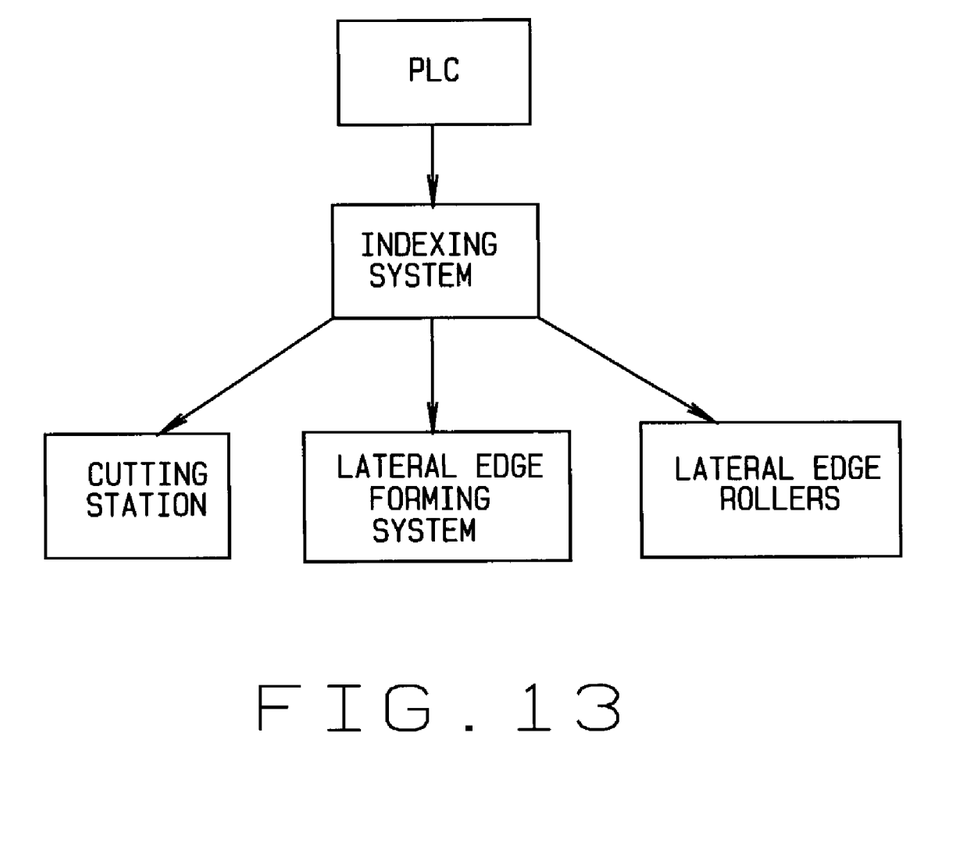
FIG. 13 is a block diagram of the control system.

FIG. 13 is a block diagram which shows the control path of the various adjustments. The PLC is set to control the indexing station 30 to cut the wallboard to the desired length. It also signals the lateral edge forming station 45 to move to the width necessary to accommodate the length of wallboard being cut.

Finally, the indexing station 35 also senses the thickness of wallboard being processed and signals the edge forming rollers 55*a*,55*b* to move to the spacing necessary to accommodate the thickness of wallboard.

The above-described manufacturing systems is a cost-effective and highly reliable in-line method for fabricating gypsum wall panels that include a recessed area along each side edge. The system includes a cutting station that facilitates drywall panels to be cut at variable lengths without stopping operation of the production line. Additionally, the system includes a lateral edge former that facilitates forming a recessed area along the lateral edges of a wallboard panel such that all four side edges include a recessed area on the same side. Wallboard panels fabricated to include recessed areas near each panel side edge increase the flexibility of installation orientations available when such panels are installed. As a result, the manufacturing system facilitates reducing overall construction costs by producing a wallboard panel including four recessed areas in a cost-effective and reliable manner.

The lateral edge recess forming system has been described as installed in-line. It also can be set up off-line where the cut panels are accumulated and then fed into the lateral cut edge forming system.

Exemplary embodiments of wallboard manufacturing systems are described above in detail. The systems are not limited to the specific embodiments described herein, but rather, components of each system and embodiment may be utilized independently from other components and embodiments described herein.

While the invention has been described in terms of various specific embodiments, those skilled in the art will recognize that the invention can be practical with modification within the spirit and scope of the claims.

In view of the above, it will be seen that the several objects and advantages of the present invention have been achieved and other advantageous results have been obtained.

What is claimed is:

1. A method of making wallboard comprising the steps of:
   forming a continuous slab of wallboard having opposed face surfaces bordered by a pair of longitudinal side edges;
   forming longitudinal recessed areas along said side edges on a first face of the wallboard;
   forming a first desired cut length or wallboard from the wallboard slab whereby the side edges of the cut length are connected by opposed lateral edges;
   forming recessed areas in said opposed lateral edges of the first face of said cut wallboard length by moving the lateral edges of the cut length of wallboard through a series of laterally spaced roller sets aligned with each of said lateral edges the roller sets having vertically spaced rollers;
   adjusting the vertical spacing of the vertically spaced rollers of the roller sets in response to the thickness of the wallboard being processed; and
   adjusting the size of the wallboard lengths and simultaneously adjusting the lateral spacing of the sets of vertically spaced rollers to accommodate the size of the cut wallboard lengths.

2. A method of making wallboard comprising the steps of:
   forming a continuous slab of wallboard having opposed face surfaces bordered by a pair of longitudinal side edges;
   forming longitudinal recessed areas along said side edges on a first face of the wallboard;
   forming a first desired cut length of wallboard from the wallboard slab whereby the side edges of the cut length are connected by opposed lateral edges;
   forming recessed areas in said opposed lateral edges of the first face of said cut wallboard length by moving the lateral edges of the cut wallboard length through a series of laterally spaced sets of vertically spaced rollers aligned with each of said lateral edges; and
   forming a second desired cut length of wallboard from the wallboard slab which is of different length from the first cut length and adjusting the lateral spacing of the sets of vertically spaced rollers without interrupting formation of said continuous slab.

3. The method of claim 2 including the step of coordinating the forming of the first and second cut lengths of wallboard with the lateral sparing of the vertically spaced rollers.

4. A system for making wallboard comprising:
   a casting conveyor for forming a continuous slab of wallboard from a slurry, the wallboard having inner and outer paper surfaces bordered by a pair of longitudinal side edges, said conveyor having shaped recess formers along the sides thereof to form recesses in the inner surface of the wallboard slab;
   a cutting system adjacent to the end of said conveyor for cutting the wallboard slab to desired lengths, whereby the side edges are connected by opposed lateral edges, said cutting system and said conveyor being coordinated to cut different lengths without interruption of production;
   a lateral edge forming system for forming lateral recessed areas in lateral edges of the wallboard lengths which comprises a series of laterally spaced roller sets aligned with the cut length lateral edges, the roller sets having vertically spaced rollers whose axes of rotation are aligned; and the cutting system and the lateral edge forming system being coordinated whereby the laterally spaced roller sets arc moveable into alignment with the lateral edges of the different cut lengths of wallboard with out interruption of production.

* * * * *